United States Patent
Säily et al.

(10) Patent No.: US 11,930,416 B2
(45) Date of Patent: Mar. 12, 2024

(54) CONTEXT PREPARATION FOR CONSECUTIVE CONDITIONAL HANDOVERS

(71) Applicant: Nokia Solutions and Networks Oy, Espoo (FI)

(72) Inventors: Mikko Säily, Laukkoski (FI); Tommi Jokela, Espoo (FI); Sofonias Hailu, Oulu (FI)

(73) Assignee: Nokia Solutions and Networks OY, Espoo (FI)

( * ) Notice: Subject to any disclaimer, the term of this patent is extended or adjusted under 35 U.S.C. 154(b) by 12 days.

(21) Appl. No.: 17/274,550

(22) PCT Filed: Sep. 17, 2019

(86) PCT No.: PCT/FI2019/050661
§ 371 (c)(1),
(2) Date: Mar. 9, 2021

(87) PCT Pub. No.: WO2020/065126
PCT Pub. Date: Apr. 2, 2020

(65) Prior Publication Data
US 2022/0053399 A1    Feb. 17, 2022

Related U.S. Application Data

(60) Provisional application No. 62/735,957, filed on Sep. 25, 2018.

(51) Int. Cl.
*H04W 36/32* (2009.01)
*H04W 12/041* (2021.01)
(Continued)

(52) U.S. Cl.
CPC ......... *H04W 36/32* (2013.01); *H04W 12/041* (2021.01); *H04W 12/0431* (2021.01);
(Continued)

(58) Field of Classification Search
None
See application file for complete search history.

(56) References Cited

U.S. PATENT DOCUMENTS

| | | | | |
|---|---|---|---|---|
| 2010/0178920 A1* | 7/2010 | Kitazoe | ............. | H04W 36/0079 455/436 |
| 2010/0240367 A1* | 9/2010 | Lee | .................. | H04W 36/0077 455/435.2 |

(Continued)

FOREIGN PATENT DOCUMENTS

| | | |
|---|---|---|
| WO | 2014/089051 A1 | 6/2014 |
| WO | 2018/132051 A1 | 7/2018 |

OTHER PUBLICATIONS

Extended European Search Report received for corresponding European Patent Application No. 19865641.5, dated Mar. 30, 2022, 10 pages.

(Continued)

*Primary Examiner* — San Htun
(74) *Attorney, Agent, or Firm* — Barta Jones, PLLC

(57) ABSTRACT

A method includes determining, by a source base station, based on at least one of a measurement report received from a terminal device and a mobility trajectory of the terminal device, a prepared cell list that includes a set of cells where the terminal device is capable of handover. The method includes sending at least one required context for the handover to the set of cells in the prepared cell list. The method also includes receiving acknowledgement from the set of cells. The method further includes sending a handover complete message, which contains the prepared cell list, to the terminal device. The prepared cell list provides a capability for the terminal device to make a number of handovers when the terminal device is within a coverage area of the set of cells.

16 Claims, 6 Drawing Sheets

(51) Int. Cl.
*H04W 12/0431* (2021.01)
*H04W 36/00* (2009.01)
(52) U.S. Cl.
CPC ... *H04W 36/0033* (2013.01); *H04W 36/0058* (2018.08); *H04W 36/00837* (2018.08); *H04W 36/008375* (2023.05)

(56) References Cited

U.S. PATENT DOCUMENTS

| | | | | |
|---|---|---|---|---|
| 2012/0014357 A1* | 1/2012 | Jung | ............... | H04W 36/00835 370/332 |
| 2013/0084870 A1* | 4/2013 | Nylander | .......... | H04W 36/0061 455/436 |
| 2014/0023045 A1* | 1/2014 | Li | ..................... | H04W 36/0069 370/331 |
| 2014/0220974 A1 | 8/2014 | Hsu | | |
| 2016/0191471 A1* | 6/2016 | Ryoo | .................... | H04L 63/062 455/411 |
| 2018/0317137 A1* | 11/2018 | Loehr | ................. | H04W 36/023 |

OTHER PUBLICATIONS

"Discussion on Conditional Handover Optimization", 3GPP TSG-RAN WG2#101, R2-1801784, Agenda : 10.2.7, OPPO, Feb. 26-Mar. 2, 2018, pp. 1-3.

"Motivation for NR Mobility Enhancements for Rel-16", 3GPP TSG RAN Meeting #78, 3GPP TSG RAN Meeting #78, RP-172515, OPPO, Dec. 18-21, 2017, 9 pages.

"Conditional Handover—Basic Aspects and Feasibility in Rel-15", 3GPP TSG-RAN WG2 NR Adhoc #2, R2-1706489, Agenda : 10.2.8, Nokia, Jun. 27-29, 2017, 3 pages.

"Conditional Handover in NR System", 3GPP TSG-RAN WG2 Meeting#101, R2-1803044, Agenda : 10.2.7, Lenovo, Feb. 26-Mar. 2, 2018, pp. 1-3.

"Conditional Handover—Simulation Results", 3GPP TSG-RAN WG2 #101, R2-1803337, Agenda : 10.2.7, Ericsson, Feb. 26-Mar. 2, 2018, 7 pages.

"Conditional Handover", 3GPP TSG-RAN WG2 #101, R2-1803336, Agenda : 10.2.7, Ericsson, Feb. 26-Mar. 2, 2018, 6 pages.

"Introduction of Conditional Handover", 3GPP TSG-RAN2#101, R2-1802486, Agenda : 10.2.7, Samsung, Feb. 26-Mar. 2, 2018, 5 pages.

"Discussion on Conditional Handover in NR", 3GPP TSG-RAN WG2 Meeting #101, R2-1802008, Agenda : 10.2.7, ASTRI, Feb. 26-Mar. 2, 2018, pp. 1-6.

"Conditional Handover Procedure", 3GPP TSG-RAN2#101, R2-1802693, Agenda : 10.2.7, LG Electronics Inc., Feb. 26-Mar. 2, 2018, pp. 1-3.

"Ping Pong Issues for Conditional Handover", 3GPP TSG-RAN WG2 Meeting #101bis, R2-1804291, Agenda : 10.2.10, TCL, Apr. 16-20, 2018, 2 pages.

"New WID: NR Mobility Enhancements", 3GPP TSG RAN Meeting #80, RP-181433, Agenda : 9.1.10, Intel Corporation, May 21-25, 2018, 5 pages.

"3rd Generation Partnership Project; Technical Specification Group Radio Access Network; NR; NR and NG-RAN Overall Description; Stage 2 (Release 15)", 3GPP TS 38.300, V15.1.0, Mar. 2018, pp. 1-71.

"3rd Generation Partnership Project; Technical Specification Group Services and System Aspects; Security architecture and procedures for 5G system(Release 15)", 3GPP T 33.501, V15.0.0, Mar. 2018, pp. 1-128.

International Search Report and Written Opinion received for corresponding Patent Cooperation Treaty Application No. PCT/FI2019/050661, dated Dec. 4, 2019, 15 pages.

Martikainen et al., "On the Basics of Conditional Handover for 5G Mobility", IEEE 29th Annual International Symposium on Personal, Indoor and Mobile Radio Communications (PIMRC), Sep. 9-12, 2018, 7 pages.

"3rd Generation Partnership Project; Technical Specification Group Radio Access Network; Evolved Universal Terrestrial Radio Access (E-UTRA); Radio Resource Control (RRC); Protocol specification(Release 15)", 3GPP TS 36.331, V15.2.2, Jun. 2018, pp. 1-791.

\* cited by examiner

CONTEXT PREPARATION FOR CONSECUTIVE CONDITIONAL HANDOVERS

RELATED APPLICATION

This application was originally filed as PCT Application No. PCT/FI2019/050661 on Sep. 17, 2019, which claims priority from U.S. Provisional Application No. 62/735,957, filed on Sep. 25, 2018, each of which is incorporated herein by reference in its entirety.

TECHNICAL FIELD

The teachings in accordance with the exemplary embodiments of this invention relate generally to handover procedures.

BACKGROUND

An Xn handover is an inter-gNB handover that is executed over an Xn interface. An Xn interface is an interface for the interconnection of two NG-RAN nodes (for example, a gNB or an ng-eNB) within the NG-RAN architecture. The handover preparation and execution phase for an Xn handover are done without involvement of the core network. On the other hand, in an S1 handover (as defined with respect to LTE), or NG handover (as defined with respect to New Radio (NR)), the core network is involved during the handover preparation and handover execution phases. An S1 user plane (S1-UP) external interface is defined between the LTE eNodeB and the Evolved Packet Core (EPC) serving gateway (S-GW), while S1 control plane (S1-CP) interface is defined between the LTE eNB and the EPC Mobility Management Entity (MME). Equivalently, an NG-U or N3 interface is defined between the NG-RAN node and the 5G Core User Plane Function (UPF), while an NG-C or N2 interface is defined between the NG-RAN node and the 5G Core Access and Mobility Management Function (AMF). A NR handover completion phase is known to involve the core network in both handover types. Handover completion phase relates to path (RAN/CN connection) switching.

An inter-gNB handover may include signaling flows as follows. The UE sends a measurement report, for example, when a condition for handover is met. The source gNB initiates handover and issues a Handover Request over the Xn interface. The target gNB performs admission control and provides the RRC configuration as part of the Handover Acknowledgement. The UE initiates a RACH procedure to synchronize with the target cell. The UE moves the RRC connection to the target gNB and replies with a Handover Complete. The target gNB sends a Handover Complete Acknowledgement message after the handover is successfully executed. After the completion of the handover, the target gNB initiates an N2 (more generally RAN/CN interface) path switching procedure. An NG-C or N2 interface is defined between the NR gNB and the 5G Core Access and Mobility Management Function (AMF). The AMF, after successfully communicating with other CN elements, acknowledges the path switching. The target gNB sends a Resource Release message to initiate the release of resources in the source gNB that were related to the UE.

BRIEF SUMMARY

The following summary includes examples and is merely intended to be exemplary. The summary is not intended to limit the scope of the claims.

In accordance with one aspect, an example method comprises determining, by a source base station, based on at least one of a measurement report received from a terminal device and a mobility trajectory of the terminal device, a prepared cell list that includes a set of cells where the terminal device is capable of handover. The method includes sending at least one required context for the handover to the set of cells in the prepared cell list, and receiving acknowledgement from the set of cells. The method also includes sending a handover command message, which contains the prepared cell list, to the terminal device, wherein the prepared cell list provides a capability for the terminal device to make a number of handovers when the terminal device is within a coverage area of the set of cells.

In accordance with another aspect, an example method comprises sending, by at least one terminal device, at least one measurement report to a source base station, and receiving a handover command from the source base station, wherein the handover command includes a prepared cell list of a set of cells where the terminal device is capable of handover and the prepared cell list provides a capability for the terminal device to make a number of handovers when the terminal device is within a coverage area of the set of cells. The method includes performing synchronization and random access with at least one cell from the set of cells, and sending a handover complete message to the at least one cell.

An additional exemplary embodiment includes a computer program, comprising code for performing the method of either of the previous two paragraphs, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

In accordance with another aspect, an example apparatus comprises means for determining, by a source base station, based on at least one of a measurement report received from a terminal device and a mobility trajectory of the terminal device, a prepared cell list that includes a set of cells where the terminal device is capable of handover. The apparatus further includes means for sending at least one required context for the handover to the set of cells in the prepared cell list, and means for receiving acknowledgement from the set of cells. The apparatus further includes means for sending a handover command message that contains the prepared cell list, to the terminal device, wherein the prepared cell list provides a capability for the terminal device to make a number of handovers when the terminal device is within a coverage area of the set of cells.

An exemplary apparatus includes one or more processors and one or more memories including computer program code. The one or more memories and the computer program code are configured to, with the one or more processors, cause the apparatus to perform operations comprising: determining, by a source base station, based on at least one of a measurement report received from a terminal device and a mobility trajectory of the terminal device, a prepared cell list that includes a set of cells where the terminal device is capable of handover; sending by the source base station at least one required context for the handover to the set of cells in the prepared cell list; receiving by the source base station acknowledgement from the set of cells; and sending by the source base station a handover command that contains the prepared cell list to the terminal device, wherein the prepared cell list provides a capability for the terminal device to make a number of handovers in response to the terminal device being within a coverage area of the set of cells.

An exemplary computer program product includes a computer-readable storage medium bearing computer program code embodied therein for use with a computer. The computer program code includes: code for determining, by a source base station, based on at least one of a measurement report received from a terminal device and a mobility trajectory of the terminal device, a prepared cell list that includes a set of cells where the terminal device is capable of handover; code for sending by the source base station at least one required context for the handover to the set of cells in the prepared cell list; code for receiving by the source base station acknowledgement from the set of cells; and code for sending by the source base station a handover command that contains the prepared cell list to the terminal device, wherein the prepared cell list provides a capability for the terminal device to make a number of handovers in response to the terminal device being within a coverage area of the set of cells.

In accordance with another aspect, an example apparatus comprises means for sending, by at least one terminal device, at least one measurement report to a source base station. The apparatus includes means for receiving a handover command from the source base station, wherein the handover command includes a prepared cell list of a set of cells where the terminal device is capable of handover and the prepared cell list provides a capability for the terminal device to make a number of handovers when the terminal device is within a coverage area of the set of cells. The apparatus further includes means for performing synchronization and random access with at least one cell from the set of cells, and means for sending a handover complete message to the at least one cell.

An exemplary apparatus includes one or more processors and one or more memories including computer program code. The one or more memories and the computer program code are configured to, with the one or more processors, cause the apparatus to perform operations comprising: sending, by a terminal device, at least one measurement report to a source base station; receiving, by the terminal device and in response to the at least one measurement report, a handover command from the source base station, wherein the handover command includes a prepared cell list of a set of cells where the terminal device is capable of handover and the prepared cell list provides a capability for the terminal device to make a number of handovers in response to the terminal device being within a coverage area of the set of cells; performing, by the terminal device, synchronization and random access with at least one cell from the set of cells; and sending, by the terminal device, a handover complete message to the at least one cell.

An exemplary computer program product includes a computer-readable storage medium bearing computer program code embodied therein for use with a computer. The computer program code includes: code for sending, by a terminal device, at least one measurement report to a source base station; code for receiving, by the terminal device and in response to the at least one measurement report, a handover command from the source base station, wherein the handover command includes a prepared cell list of a set of cells where the terminal device is capable of handover and the prepared cell list provides a capability for the terminal device to make a number of handovers in response to the terminal device being within a coverage area of the set of cells; code for performing, by the terminal device, synchronization and random access with at least one cell from the set of cells; and code for sending, by the terminal device, a handover complete message to the at least one cell.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION OF THE DRAWINGS

Figure 1:
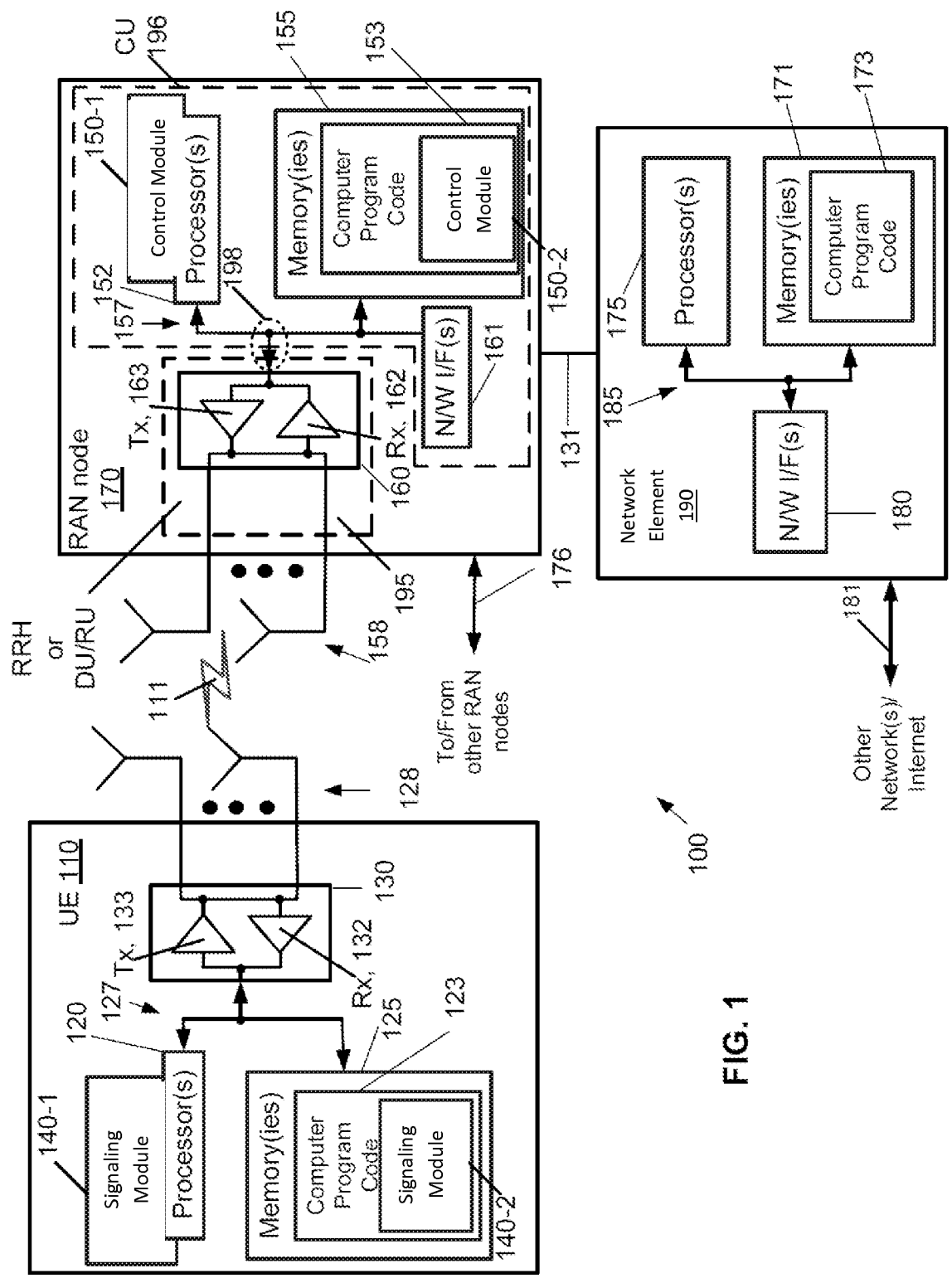
FIG. 1 is a block diagram of one possible and non-limiting example system in which the example embodiments may be practiced.

The following abbreviations that may be found in the specification and/or the drawing figures are defined as follows:

3GPP third generation partnership project
5G fifth generation
5GC 5G core network
AMF access and mobility management function
ANR Automatic Neighbour (Neighbor) Relation
ARFCN Absolute Radio Frequency Channel Number
CN core network
C-RNTI Cell Radio Network Temporary Identifier
CU central unit
DL downlink
DU distributed unit
eLTE Evolved LTE
EMM EPS Mobility Management
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
GUTI Global Unique Temporary Identifier
HF High Frequency
ID identification
I/F interface
LTE long term evolution
MAC medium access control
MEC multi-access edge computing
MeNB Master eNB
MME mobility management entity
MTC Machine Type Communications
NCC Next Hop Chaining Count
NF Network Function ng or NG next generation
ng-eNB or NG-eNB next generation eNB
NH Next Hop Key
NR new radio
N/W or NW network
PCI Physical Cell ID
PDCP packet data convergence protocol
PDU Protocol Data Unit
PHY physical layer
RAN radio access network
Rel release
RLC radio link control
RNTI Radio Network Temporary Identifier
RRH remote radio head
RRC radio resource control
RU radio unit
Rx receiver
SCell Secondary cell
SCG Secondary cell group
SDAP service data adaptation protocol
SGW serving gateway
SMF session management function
TS technical specification
Tx transmitter
UE user equipment (e.g., a wireless, typically mobile device)
UL uplink
UP user plane function In the example embodiments as described herein a method and apparatus provides enabling consecutive conditional handovers with a single preparation phase.

Turning to FIG. 1, this figure shows a block diagram of one possible and non-limiting exemplary system in which the exemplary embodiments may be practiced. A user equipment (UE) 110, radio access network (RAN) node 170, and network element(s) 190 are illustrated. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a signaling module 140, comprising one of or both parts 140-1 and/or 140-2, which may be implemented in a number of ways. The signaling module 140 may be implemented in hardware as signaling module 140-1, such as being implemented as part of the one or more processors 120. The signaling module 140-1 may be implemented also as an integrated circuit or through other hardware such as a programmable gate array. In another example, the signaling module 140 may be implemented as signaling module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more gNBs 170 communicate using, e.g., link 176. The link 176 may be wired or wireless or both and may implement, e.g., an Xn interface for 5G, an X1 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element(s) 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium or other device that may be any media or means that can contain or store the instructions for use by or in connection with an instruction execution system, apparatus, or device, such as a computer.

Having thus introduced one suitable but non-limiting technical context for the practice of the example embodiments of this invention, the example embodiments will now be described with greater specificity.

Figure 2:
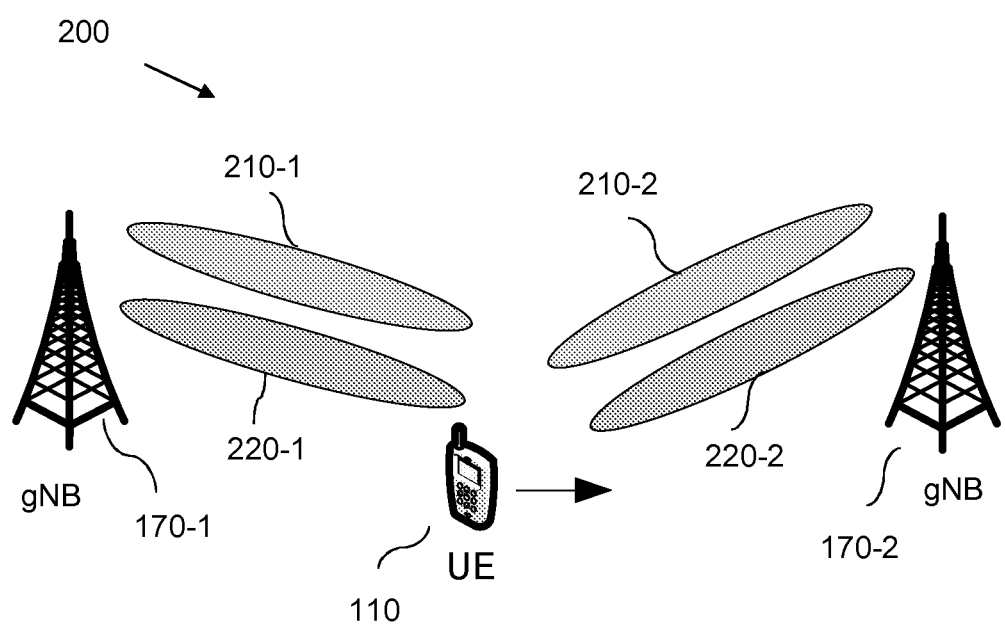
FIG. 2 shows an example illustration of a UE moving between gNBs in high frequency.

Referring to FIG. 2, an example illustration is shown of a UE 110 moving between gNBs 170 in high frequency 200. As shown in FIG. 2, a UE 110 may move between an area at which it receives coverage (210-1 and 220-1) from a source (or anchor) gNB 170-1 to an area of a target gNB 170-2 at which it receives coverage (210-2 and 220-2).

Figure 3:
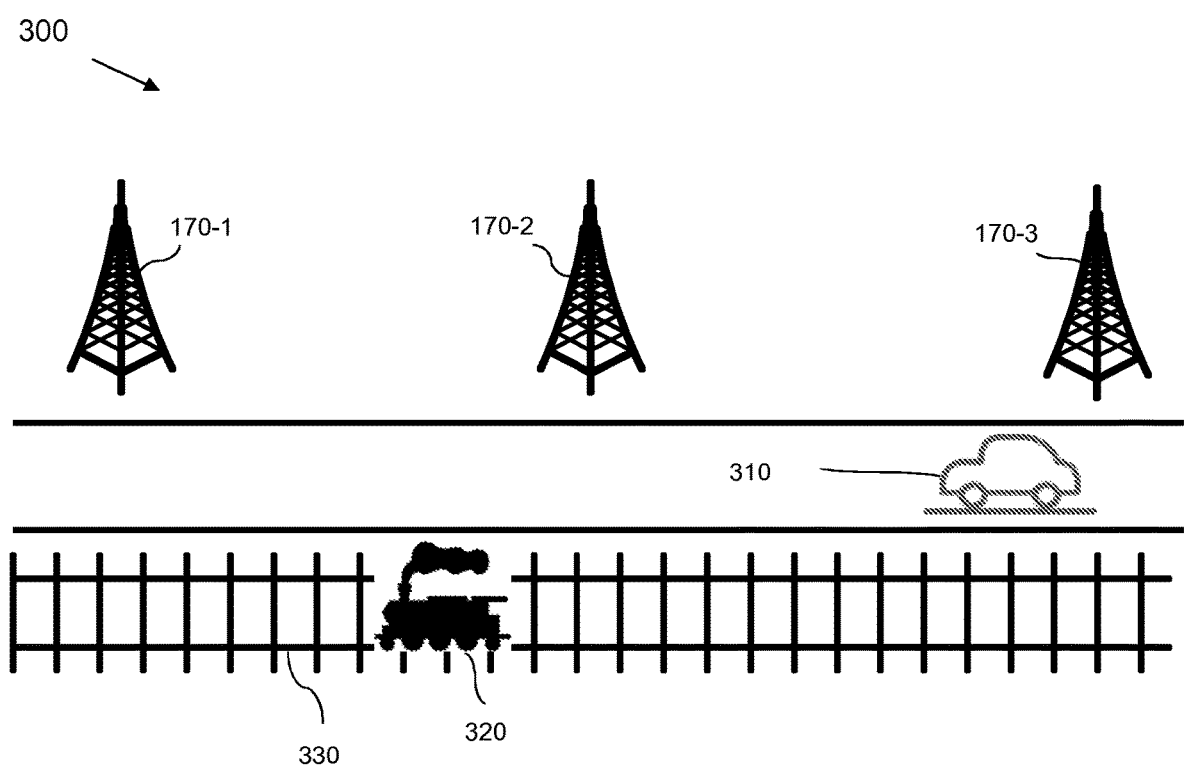
FIG. 3 shows an example illustration of a UE Moving at a high speed.

Referring to FIG. 3, an example is shown of an illustration of a UE 110 moving at a high speed 300. As shown in FIG. 3, a vehicle, such as car 310 or train 320 on track 330, including UE(s) 110 (not shown in FIG. 3) may move at a high speed that requires handover from different gNBs 170 (170-1, 170-2, 170-3, etc.).

The example embodiments provide two (main) context preparation methods that allows UE 110 to make a (for example, unlimited) number of consecutive conditional handovers within the coverage area of the prepared cell(s). The set of prepared cells can thus be chosen based on the measurement report received from the UE 110 and/or determining the mobility trajectory of the UE 110, for example, the cells along the train track or highway can be prepared for a high-speed UE in fast train or a highway shown in FIG. 3. These may be applied in scenarios such as those disclosed in FIGS. 2 and 3. A prepared cell is a cell that has a 'UE context' that allow the UE 110 to autonomously handover to the cell if a condition is met. The 'UE context' may include (for example, all) the context information that the cell receives during a handover preparation phase. For example, the context information may include radio bearer information and RRC context. The RRC context includes UE security capability, the currently used security algorithm, a horizontally derived security key, for example, a security key $K_{gNB}^{*}$ derived using target (for example, gNB 2's 170-2) cell PCI, its frequency ARFCN-DL, and the current $K_{gNB}$, and the NCC value. Note that, the target gNB 170-2 uses the received $K_{gNB}^{*}$ directly as $K_{gNB}$ to be used with the UE 110, and the target gNB 170-2 associates the NCC value received from source gNB 170-1 with the $K_{gNB}$. Multiple versions of these contexts exist for process two as described herein below with respect to FIG. 4. The UE 110 may also have the corresponding 'UE context' that the UE 110 requires during the autonomous handover to the cell. Multiple (for example, unlimited, several, etc.) consecutive handovers may arise within a limited coverage area. For example, the "Xn coverage area" might be in practice limited to neighbor cells, for example, cells identified by the ANR. However, due to ping pong, there may be a large number of possible consecutive handovers within a small number of prepared cells. For example, in an instance in which base stations are represented by A to D, the handovers may follow a pattern A→B→D→B→C→A→D→C, etc.

Figure 4:
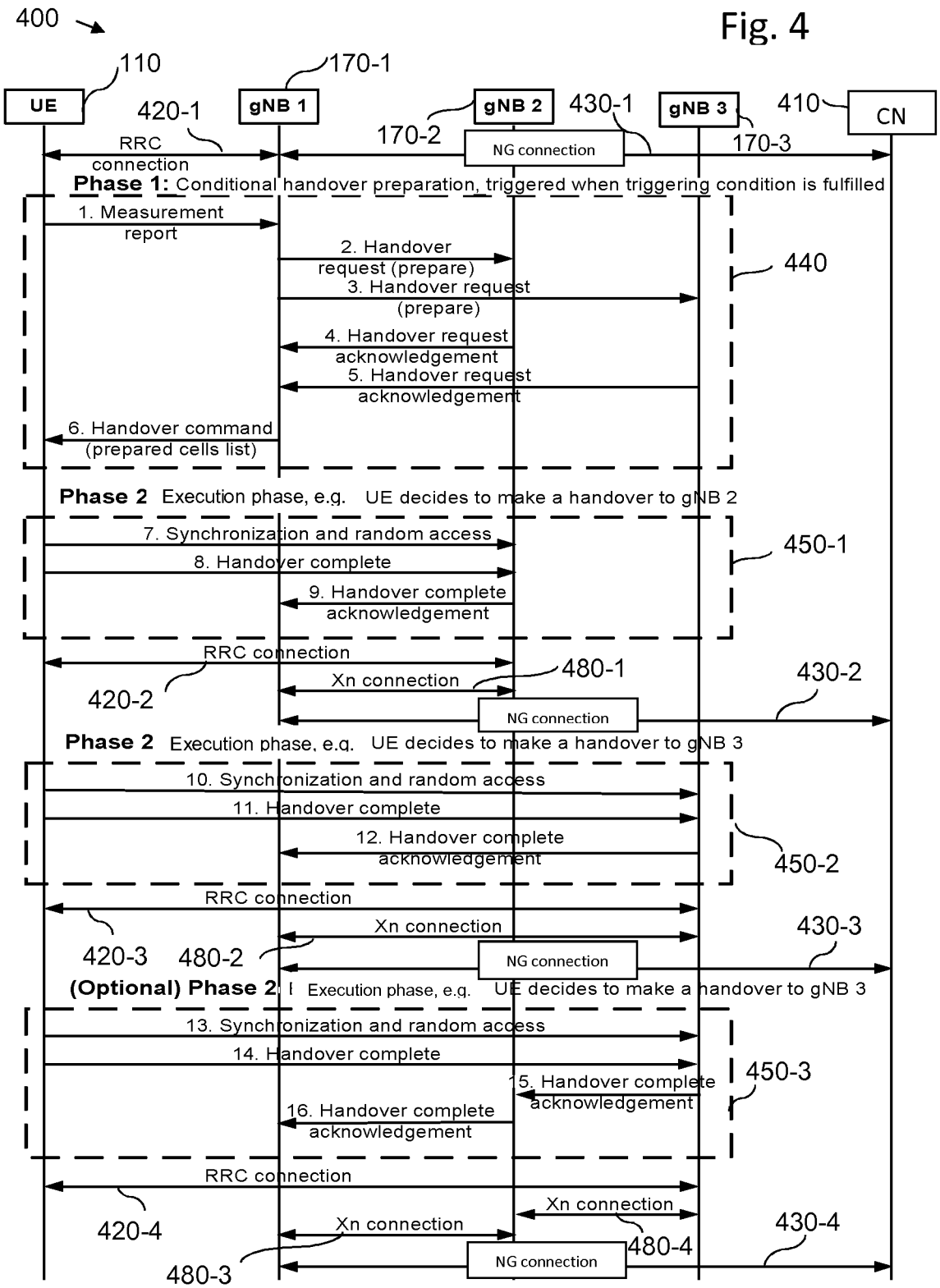
FIG. 4 is an example illustration of handover with prepared gNBs for consecutive UE based handovers.

FIG. 4 is an example illustration of a call flow for handover with prepared gNBs 170 for consecutive UE based handovers 400. FIG. 4 includes signaling between UE 110, gNB 170-1, gNB 170-2, gNB 170-3 and CN 410. Example embodiments of processes for enabling consecutive conditional handovers with a single preparation phase are disclosed with respect to FIG. 4. The example embodiments provide two context preparation processes that allow a UE to make an unlimited number of consecutive conditional handovers within the coverage area of the prepared cell(s).

The coverage area may be as large as up to the entire Xn coverage of the gNB 170 configuring the UE 110 for conditional handover (which may be referred as an anchor gNB 170). In both processes (process one and process two, as described below), the anchor gNB 170 terminates the NG interface for the UE 110. Thus, path switching is not initiated after each conditional handover, which can be indicated in the Handover Request message during conditional handover preparation. The anchor gNB 170 prepares and distributes the necessary context within the prepared cell(s).

In context preparation process one as described herein below with respect to FIG. 4, each prepared cell receives multiple contexts, with each context generated considering the path that the UE 110 could take to reach the target cell from the source cell, for example, different horizontally generated security keys for each path. The horizontally generated security key may be a security key $K_{gNB}^{*}$ derived using target (for example, cell) PCI, its frequency ARFCN-DL, and the current $K_{gNB}$ (or other horizontally derived intermediate keys). That is, $K_{gNB}^{*}$=f(target 'cell A' PCI, target 'cell A' ARFCN-DL, $K_{gNB}$), $K_{gNB}^{**}$=f(target cell 'cell B' PCI, target 'cell B' ARFCN-DL, $K_{gNB}^{*}$), etc. For example, assuming there are three cells, for example, cell 1 (that belongs to anchor gNB), cell 2 and cell 3, the UE 110 could reach cell 3 directly from cell 1 or through cell 2. Thus, there are at least two possible paths in this case, and each path requires (for example, needs) different horizontally generated keys in case key change is enabled during handover. In contrast, a vertically derived key (which is not used in this instance) may be derived from target PCI, its frequency ARFCN-DL, and fresh NH.

In method two, each prepared cell receives a single context, and when the UE 110 enters a new cell, the UE 110 generates the new security key using the security key that has been in use in the originating source cell preparing the target cells, for example, the anchor gNB 170 cell. Security keys may be derived using target PCI, its frequency ARFCN-DL, and the current $K_{gNB}$. When deriving a $K_{gNB}^{*}$ from current $K_{gNB}$, this comprises horizontal key derivation. A security key is horizontally derived if it is generated from target cell PCI, its frequency ARFCN-DL, $K_{gNB}$ and other minor parameters.

In both approaches, the prepared context may remain valid based on a validity timer or until the UE 110 moves out of the coverage area of the prepared list of cells.

Although the example embodiments are described with respect to a scenario in which each gNB 170 has a single cell so that gNB and cell can be used interchangeably for clarity of presentation, the principles disclosed with respect to the example embodiments may be applied in instances in which gNBs 170 have multiple cells. In the example embodiments, 'C' is used to represent the set of prepared gNBs 170. For example, referring to FIG. 4, the prepared gNBs 170 contains N=2 gNBs 170, although the number of gNBs 170 is assumed to be arbitrary, that is, gNBs 170 1, 2, 3, ... N. Thus C is the set {2, 3, ..., N}, where gNB 1 170-1 is the source cell which prepares all the UE context for conditional handover. For two gNBs n1 and n2 (for example, gNB 2 170-2 and gNB 3 170-3) which are a member of the prepared cells, for example, n1 and n2 members of C, the hop number is defined as follows: h_{n1, n2}=1 if key update is required during handover from anchor gNB_n1 to gNB_n2. Otherwise, the hop number is 0 (zero). This is to take into account the fact that key update is not necessarily required during every handover in some systems, for example, New Radio (NR), unlike in other systems, such as LTE, where key update is required in every handover.

Process one is described with respect to FIG. 4. An RRC connection 420 (shown as 420-1 to 420-3) may be formed between the UE 110 and gNBs 170. An NG (which may consist of NG-C and NG-U connections, shown for example as 430-1 and 430-3, respectively) connection 430 (shown as 430-1 to 430-3) may be formed between CN (for example, AMF) 410 and the gNBs 170. Xn connections 480 (shown as 480-1, etc.) may be formed between gNBs 170. Steps 1-6 comprise phase 1 (one) 440 in which conditional handover preparation is triggered when triggering condition is fulfilled. An execution phase, phase 2 (two) 450, may be determined based on which gNB 170 the UE 110 decides to make the handover to. Phase 2 450-1 is described in steps 7-9 when the UE 110 determines to execute a handover to gNB 2 170-2. Phase 2 450-2 is described in steps 10-12 when the UE 110 determines to execute a handover to gNB 3 170-3, and optionally, phase 2 450-3 is described in steps 13-16, when the UE 110 decides to handover to gNB 3 170-3. Steps 1-16 are described below.

Phase 1 440 begins with step 1), where the UE 110 sends measurement report triggering the preparation of candidate cells for consecutive UE autonomous handover.

At step 2), the source gNB 1 170-1 sends 'Handover request (prepare)' message to prepare gNB 2 170-2. The handover request message contains multiple versions of UE context that would be needed by gNB 2 170-2 in case of UE handover. Each version contains a security key that is generated for a specific sequence of handovers that the UE 110 may reach the target cell. For example, consider there are prepared gNBs 1 170-1 (anchor), 2 (gNB 2 170-2), and 3 (gNB 3 170-3) with $h\_\{1,2\}=1$, $h\_\{1,3\}=1$ and $h\_\{2,3\}=1$. The UE 110 may reach gNB 2 170-2 through two paths: First path through a direct handover from gNB1 170-1 (for example, anchor gNB); and second path through handover to gNB 3 170-3 first and then to gNB2 170-2.

During the conditional handover preparation phase, gNB 2 170-2 receives two versions of UE context. Version one context is to be used if the UE 110 arrived at gNB 2 170-2 through path one, for example, using a security key KeNB_2 derived using KeNB_1 (the key that has been in use in anchor gNB). That is, using KeNB 1, cell 3 PCI, cell 3 ARFCN-DL. Version two context is to be used if the UE 110 arrives at gNB 2 170-2 through path two, for example, using a security key generated from KeNB_3, which is generated from KeNB_1. That is, KeNB2 is derived using KeNB_3, cell 2 PCI, cell 2 ARFCN-DL. KeNB3 is derived using KeNB1, cell 3 PCI, cell 3 ARFCN-DL. The handover request (prepare) message contains an indicator that if the handover is materialized, it does not require path switching (for example, path switching is not to be initiated after the execution of the handover). The handover request message contains Xn tunneling information for data communication between source and target gNBs 170, including data forwarding. Note that a "path" may also include ping pongs, for example, A→B→D→B→C, although the total number of paths considered should be limited for practical reasons, for example, only two paths are considered in this example. The command may include a request for dedicated resource, for example, depending on the likelihood of handover to the cell. Note also that in contrast to the example embodiments, legacy and conditional handovers only consider the direct path (path one, for example, first path through a direct handover).

At step 3), the source gNB 1 170-1 sends 'handover request (prepare)' message to prepare gNB 3 170-3. The Handover request message contains multiple versions of UE context that would be needed by gNB 3 170-3 in case of UE 110 handover. Each version contains a security key that is generated for a specific sequence of handovers that the UE 110 may implement to reach the cell. For example, consider there are prepared gNBs 1 170-1 (anchor or source gNB), 2, and gNB 3 170-3 with $h\_\{1,2\}=1$, $h\_\{1,3\}=1$. The UE 110 may reach gNB 3 170-3 through two paths: The first path may be through a direct handover from gNB1 170-1 (for example, anchor gNB); and the second path through handover to gNB2 170-2 first and then to gNB3 170-3.

During the conditional handover preparation phase, gNB3 170-3 receives two versions of UE context. Version one context is to be used if UE 110 arrived at gNB3 170-3 through path one, for example, a security key KeNB_3 derived using KeNB_1 (the key that has been in use in anchor gNB). That is, using KeNB 1, cell 3 PCI, cell 3 ARFCN-DL. Version two context is to be used if UE 110 arrives at gNB3 170-3 through path two, for example, security key generated from KeNB_2, which is generated from KeNB_1. That is, KeNB2 is derived using KeNB 1, cell 2 PCI, cell 2 ARFCN-DL. KeNB3 is derived using KeNB2, cell 3 PCI, cell 3 ARFCN-DL.

The handover request (prepare) message contains an indicator that, if the handover is materialized, the handover does not require path switching (path switching is not initiated after the execution of the handover). The handover request message contains Xn tunneling information for data communication between source and target gNBs 170, including data forwarding. Note that a "path" may also include ping pongs, for example, A→B→D→B→C, although the total number of paths considered may be limited for practical reasons, for example, only two paths are considered in this implementation example embodiment. The command may include a request for dedicated resource, for example, depending on the likelihood of handover to the cell. Note also that in contrast with the legacy and conditional handovers, only the direct path (path one in the above example) is considered.

At step 4), the Handover request acknowledgement from gNB 2 170-2 acknowledges the handover request message if cell dedicated resources are not required. If cell dedicated resources are required, the target cell accepts the handover request only if the cell can admit the UE 110. The cell dedicated resources may include radio resources, dedicated RACH preamble, and UE identifier. Note that in some instances, a "resume ID" type of identity may be used in case a temporary UE C-RNTI is not reserved in a prepared cell. In some example embodiments, including cell dedicated resources may not be mandatory requirement for all prepared cells. By avoiding the mandatory requirement, the example embodiments prevent resource wastage in case multiple cells are prepared, for example based on different grade of information preparation depending on the handover likelihood. According to example embodiments, a UE ID may implement a "resume ID" type identifier as UE context identifier, which will be used during initial access for UE 110 based handover. The UE 110 may then be given a new C-RNTI once the UE 110 accesses a prepared cell. This approach may reduce pre-allocating UE C-RNTIs in all prepared cells, where most of them might not be used by the UE 110.

At step 5), a Handover request acknowledgement from gNB 3 170-3 acknowledges the handover request message if cell dedicated resources are not required. If cell dedicated resources are required, the target cell accepts the handover request only if it can admit the UE 110. The cell dedicated resources may include radio resources, dedicated RACH preamble, and UE identifier. According to example embodiments, a "resume ID" type of identity may be used in case a temporary UE C-RNTI is not reserved in a prepared cell. The selection of what UE ID (which may be temporary C-RNTI, "resume ID" type of identity, or may be other type) to give to the UE 110 is done by the target gNB 170. This ID is provided to the UE 110 during handover preparation phase. The UE 110 uses the ID (to identify itself) during handover to the target cell. The target gNB 170 identifies the UE 110 based on the ID. In some instances, a given gNB 170 may be a candidate for multiple conditional handovers by different UEs 110 (with unique IDs).

At step 6), a Handover command includes set C, for example, prepared cell list (gNB 2 170-2 and gNB 3 170-3 in this example), and the hop number amongst the anchor gNB 170 and all the prepared cells, for example, $\{h\_a, n\}\_\{n\in C\}$ ($h\_\{1,2\}=1$, $h\_\{1,3\}=1$, $h\_\{2,3\}=1$ in this example). The handover command also includes part or all of the standard handover command context, for example, NCC value that will be needed during key derivation. The handover command may also include cell dedicated resources, for example, RACH preambles, and scheduling resources. The hop number indicates whether key change is required during handover or not (for example, in systems in which this is optional, such as NR). For example, if h_{1, 2}=1, then key change is required during handover from cell 1 to cell 2.

Phase 2 450-1, in instances in which UE 110 decides to make a handover to gNB 2 170-2, may begin with step 7), where the UE 110 initiates RACH procedure to synchronize with the gNB 2 170-2.

At step 8) The UE 110 moves the RRC connection to the target gNB 170 (in the instance illustrated in FIG. 4, gNB 2 170-2) and sends the handover complete message. The handover complete message may contain a handover history from the anchor gNB 170 to reach the target cell. The handover history will help the target gNB 170 determine the path the UE 110 took to reach its cell starting from the source cell (the gNB 170 that prepared the candidate cells, gNB 1 170-1 in this example). The UE 110 generates its security key in the same manner as described herein above (for example, with legacy handover and conditional handover messages). Consequently, the UE 110 impact of process one is that the UE 110 may be required to track the handover history and needs to send the handover history to the target cell along with (for example, by multiplexing) the handover complete message.

At step 9), the target gNB 170 (gNB 2 170-2) sends a handover complete acknowledgement message after the handover is successfully executed. Based on the received handover history, gNB 2 170-2 determines the path the UE 110 uses to reach the gNB 2 170-2. The gNB 2 170-2 then uses the corresponding context (context for path one, direct path gNB 1→gNB 2, in this example) for further communication with the UE 110. The handover complete acknowledgement message may also contain Xn tunneling information for data communication between source and target gNBs 170, including data forwarding. At this stage, the UE 110 has an RRC connection with the target gNB 2 170-2. However, the NG connection still remains between the source gNB 1 170-1 and the CN 410. There is an Xn connection between gNB 1 17-0-1 and gNB 2 170-2.

Phase 2 450-2, in instances in which UE 110 decides to make a handover to gNB 2 170-2, may begin with step 10), where the UE 110 initiates RACH procedure to synchronize with the gNB 3 170-3.

At step 11), the UE 110 moves the RRC connection to the target gNB 170 (gNB 3 170-3) and sends the handover complete message. The handover complete message may contain a handover history from the anchor gNB 170 to reach the target cell. The UE 110 generates its security key in a similar manner as described herein above (for example, with legacy handover and conditional handover messages). Consequently, the UE 110 impact of method one is that the UE 110 may be required to track the handover history and needs to send the handover history to the target cell along with (for example, by multiplexing) the handover complete message.

At step 12), the target gNB 170 sends a handover complete acknowledgement message after the handover is successfully executed. Based on the received handover history, the gNB 170 determines the path the UE 110 uses to reach the gNB 170. The gNB 170 then uses the corresponding context (context for path two, indirect path gNB 1→gNB 2→gNB 3, in this example) for further communication with the UE 110. The handover complete acknowledgement message also contains Xn tunneling information for data communication between source and target gNBs 170, including data forwarding. At this stage, the UE 110 has an RRC connection with the target gNB 3 170-3. However, the NG connection still remains between the source gNB 1 170-1 and the CN 410. There is an Xn connection between gNB 1 170-1 and gNB 3 170-3.

Phase 2 450-3, in instances in which UE 110 decides to make a handover to gNB 3 170-3, may begin with step 13) (Optional implementation), which is the same as step 10. Step 14) (Optional implementation) is the same as step 11. Step 15) (Optional implementation) is the same as step 12 except the handover complete acknowledgement message is sent to gNB 2 170-2. The handover complete acknowledgement message may include Xn tunneling information 480 between gNB 2 170-2 and gNB 3 170-3.

At step 16) (Optional implementation), the gNB 2 170-2 forwards handover complete acknowledgement message to gNB 1 170-1 along with Xn tunneling information 480-3 between gNB 1 170-1 and gNB 2 170-2. At this stage, there is a RRC connection 420 (420-4) between UE 110 and gNB 3 170-3. There is an Xn connection 480 (480-4 and 480-4) between gNB 1 170-1 and gNB 2 170-2, and between gNB 2 170-2 and gNB 3 170-3. However, the NG connection 430 (430-4) still remains between the source gNB 1 170-1 and the CN 410.

Process two is also described with reference to FIG. 4. This process is also applicable for proactive SeNB context preparation over many cells.

Phase 1 440 begins with step 1), where the UE 110 sends measurement report triggering the preparation of candidate cells for consecutive UE 110 autonomous handover.

At step 2), the source gNB 1 170-1 sends a handover request (prepare) message to prepare gNB 2 170-2. The message contains necessary information for handover to the target gNB (gNB 2 170-2), such as radio bearer information and RRC context, for example, a security key KeNB_2 derived using KeNB_1 (the key that has been in use in anchor gNB). That is, using KeNB 1, cell 2 PCI, cell 2 ARFCN-DL. In addition to all the necessary information to the target gNB (for example, radio bearer information and RRC context), the message context may contain an indicator that if the handover is materialized, the handover does not require path switching (path switching is not initiated after the execution of the handover), and contain Xn tunneling information for data communication between source gNB 170 (gNB 1 170-1) and target gNB 170 (gNB 2 170-2), including data forwarding.

At step 3), the source gNB 1 170-1 sends handover request (prepare) message to prepare gNB 3 170-3. A Handover request (prepare) message contains necessary information for handover to the target gNB (gNB 3 170-3), such as radio bearer information and RRC context, for example, and a security key KeNB_3 derived using KeNB_1 (the key that has been in use in anchor gNB). That is, using KeNB 1, cell 3 PCI, cell 3 ARFCN-DL. In addition to all the necessary information to the target gNB (for example, radio bearer information and RRC context), the message context additionally contains an indicator that if the handover is materialized, the handover does not require path switching (path switching is not initiated after the execution of the handover), and an Xn tunneling information for data communication between source (gNB 1 170-1) and target gNB 170 (gNB 3 170-3), including data forwarding.

At step 4), a Handover request acknowledgement from gNB 2 170-2 that acknowledges the handover request message if cell dedicated resources is not required. If cell dedicated resources are required, the target cell accepts the handover request only if the target cell can admit the UE 110. The cell dedicated resources may include radio resources, dedicated RACH preamble, and UE identifier. According to example embodiments, a "resume ID" type of identity may be used in case a temporary UE C-RNTI is not reserved in a prepared cell. The selection of what UE ID (which could be temporary C-RNTI, "resume ID" type of identity, or may be other type) to give to the UE 110 is done by the target gNB 170. This ID is provided to the UE 110 during handover preparation phase. The UE 110 uses the ID (to identify itself) during handover to the target cell. The target gNB 170 identifies the UE 110 based on the ID. In some instances, a given gNB 170 may be a candidate for multiple conditional handovers by different UEs 110 (with unique IDs).

At step 5), a Handover request acknowledgement from gNB 3 170-3 acknowledges the handover request message if cell dedicated resources are not required. If cell dedicated resources are required, the target cell accepts the handover request only if the target cell can admit the UE 110. The cell dedicated resources may include radio resources, dedicated RACH preamble, and UE identifier. According to example embodiments, a "resume ID" type of identity may be used in case a temporary UE C-RNTI is not reserved in a prepared cell.

At step 6), a Handover command includes set C, for example, prepared cell list, and $\{h\_n1,n2\}\_\{n1,n2 \in C\}$ ($h\_\{1,2\}=1$, $h\_\{1,3\}=1$, $h\_\{2,3\}=1$ in this example). The handover command also includes part or all of the standard handover command context, for example, an NCC value that will be used for horizontal key generation. The handover command may also include cell dedicated resources, for example, RACH preambles, scheduling resources, etc.

Phase 2 450-1, in instances in which UE 110 decides to make a handover to gNB 2 170-2, may begin with step 7), where the UE 110 initiates RACH procedure to synchronize with the gNB 2 170-2.

At step 8), the UE 110 moves the RRC connection to the target gNB (gNB 2) and sends the Handover Complete message. The UE 110 may derive its security key using the security key that has been in use with the source gNB 170 (gNB 1 170-1). That is, using KeNB 1, cell 2 PCI, cell 2 ARFCN-DL. Consequently, the UE 110 impact of process two is that the UE 110 derives the security key using the key that has been in use in the source gNB 170. This impact is visible especially when the UE 110 arrives at the target gNB 170 through indirect path, for example, see step 11 below.

At step 9), the target gNB sends a handover complete acknowledgement message after the handover is successfully executed. The target gNB 170 uses the proactively prepared context for communication with the UE 110. The handover complete acknowledgement message may also include Xn tunneling information for data communication between source and target gNBs 170, including data forwarding. At this stage, the UE 110 has an RRC connection with the target gNB 2 170-2. There is an Xn connection between gNB 1 170-1 and gNB 2 170-2. However, the NG connection still remains between the source gNB 1 170-1 and the CN 410.

Phase 2 450-2, in instances in which UE 110 decides to make a handover to gNB 3 170-3, may begin with step 10) The UE 110 initiates RACH procedure to synchronize with the gNB 3 170-3.

At step 11, the UE 110 moves the RRC connection to the target gNB 170 (gNB 3 170-3) and sends the handover complete message. The UE 110 may derive its security key using the security key that has been in use with the source gNB 170 (gNB 1 170-1). That is, using KeNB 1, cell 3 PCI, cell 3 ARFCN-DL. Consequently, the UE 110 impact of process two is that the UE 110 derives the security key using the key that has been in use in the source gNB 170. This impact is visible (for example, may be easily detected) especially when the UE 110 arrives at the target gNB 170 through an indirect path. In contrast to the example embodiments, with other types of handovers, the key may be generated, for example, using the key that has been in use in the previous gNB 170, gNB 2 170-2 in this case.

At step 12), the target gNB 170-1 sends a handover complete acknowledgement message after the handover is successfully executed. The target gNB 170 uses the proactively prepared context for communication with the UE 110. The handover complete acknowledgement message also contains Xn tunneling information for data communication between source and target gNBs 170, including data forwarding. At this stage, the UE 110 has an RRC connection with the target gNB 3 170-3. There is an Xn connection between gNB 1 170-1 and gNB 3 170-3. However, the NG connection still remains between the source gNB 1 170-1 and the CN 410.

Phase 2 450-3, in instances in which UE 110 decides to make a handover to gNB 3 170-3, may begin with step 13) an optional implementation, which is same as step 10), where the UE 110 initiates RACH procedure to synchronize with the gNB 3 170-3.

At step 14), which is an optional implementation, and is the same as step 12), the UE 110 moves the RRC connection to the target gNB 170 (gNB 3 170-3) and sends the handover complete message. The handover complete acknowledgement message is sent from the target gNB 170 (gNB 3 170-3) to the source gNB 170 (gNB 1 170-1) after a successful completion of the handover. The UE 110 derives its security key using the security key that has been in use with the source gNB 170 (gNB 1 170-1). That is, using KeNB 1, cell 3 PCI, cell 3 ARFCN-DL. Consequently, the UE impact (impact at the UE 110) of process two is that the UE 110 derives the security key using the key that has been in use in the source gNB 170. This impact is visible especially when the UE 110 arrives at the target gNB 170 through an indirect path, for example, see step 11. In other handovers, the key may be generated using the key that has been in use in the previous gNB 170, gNB 2 170-2 in this case.

At step 15), the target gNB 170 sends a handover complete acknowledgement message after the handover is successfully executed. The target gNB 170 uses the proactively prepared context for communication with the UE 110. The handover complete acknowledgement message is, however, sent to gNB 2 170-2. The handover complete acknowledgement message also contains Xn tunneling information for data communication between gNB 2 170-2 and gNB 3 170-3, including data forwarding. At this stage, the UE 110 has an RRC connection with the target gNB 3 170-3. There is an Xn connection between gNB 2 170-2 and gNB 3 170-3. However, the NG connection still remains between the source gNB 1 170-1 and the CN 410.

At step 16), the gNB 2 170-2 forwards the handover complete acknowledgement message to gNB 1 170-1. The gNB 2 170-2 adds Xn tunneling information for data communication and data forwarding between gNB 1 170-1 and gNB 2 170-2. At this stage, the UE 110 has an RRC connection with the target gNB 3 170-3. There is an Xn connection between gNB 1 170-1 and gNB 2 170-2, and between gNB 2 170-2 and gNB 3 170-3. However, the NG connection still remains between the source gNB 1 170-1 and the CN 410.

According to example embodiments, the above described steps of process 2 are applicable also for proactive SeNB context preparation over many cells. In the fast train 320 scenario described with respect to FIG. 3, the base station to which the UE 110 is connected to may predict the mobility path of the UE 110, for example, along the train track 330, and add the cells along the path as a potential secondary gNBs 170 (SgNBs). The required context, for example, slave RRC context, may be provided to these cells, and the corresponding context may also be sent to the UE 110. When the UE 110 enters the coverage of one of the prepared cells, the UE 110 can connect to the cells autonomously. In this setting, the source cell, for example, the cell who proactively prepared the SeNB context, may act as a master gNB (MgNB). Since the UE 110 may not have a direct radio connection to the MgNB, the UE 110 may have communicated with the MgNB through one of the SgNBs.

In another example implementation that is applicable to both the above processes described with respect to FIG. 4 (process one and process two), the prepared UE context may be valid until a validity timer set for this purpose expires. This timer may be defined or signaled. A UE 110 may not necessarily handover to a prepared cell. It would be a waste of memory capacity to keep the context indefinitely. The example embodiments may avoid this in two options. The first option is that the source cell initiates a procedure to release the prepared context when required. For example, when the UE 110 makes a handover to one of the prepared cells and the source cell receives an acknowledgement, the source cell initiates a context release procedure to the other prepared cells. The second option is to use a timer. There may be multiple alternatives implementing a timer. For instance, for an alternative one, the source cell associates and initiates a timer for each prepared cell. If the timer has been running for a given amount of time without the UE handing over to the cell, the source cell initiates a context release procedure towards the cell. For an alternative two, the timer duration could be given to all the prepared cells during the context preparation for conditional handover, and a prepared cell discards the prepared context if the UE 110 does not initiate a handover to the cell before the timer expires.

In yet another exemplary implementation application to the above methods, the prepared UE context remains valid as long the UE 110 remains within the coverage area of the prepared cells.

According to an example embodiment, in an instance in which the NG path is switched to a new gNB 170, the new gNB 170 receives a fresh {NH, NCC} pair that the gNB 170 shall use during the next handover. When the new gNB 170 generates a new AS security during the next handover based on the fresh {NH, NCC} pair, as currently required to in applicable standards, all the AS security context sent by the previous source cell to all the prepared cells become obsolete. As such, the original source gNB 170 may be required to terminate at least the NG-C control plane connection to AMF for the UE 110. However, the original source gNB 170 may not necessarily be required to terminate the NG-U user plane connection to the UPF for the UE 110. In some instances, the original source gNB 170 may be allowed to maintain a NG-U user plane connection to the UPF for the UE 110. The UE 110 requires a termination point for NG-C (for connection with AMF) and NG-U (for connection with UPF) in the RAN. As long as the UE 110 is within the coverage of the prepared cells, the NG-C is terminated at the source gNB 170 (due to the reasons mentioned earlier in the paragraph). The NG-U, however, may be terminated at the source gNB 170 or other gNB 170 that hosts one of the prepared cells. For example, if the UE 110 is under the coverage of gNB 2, that is not the source gNB 170, and the NG-U is terminated at gNB 2, data between UE 110 and UPF can be routed through gNB 2, that is, UE→gNB2→UPF for uplink transmission and vice versa for downlink. However, if the NG-U is still terminated at the source gNB 170, data between UE 110 and UPF is routed as UE→gNB2→source gNB→UPF for uplink transmission and vice versa for downlink. Therefore, relocating NG-U may be beneficial for shorter latency and lower signaling overhead. In another instance, the termination point for NG-U user plane connection to UPF may be relocated to another gNB 170, which hosts one of the cells in the prepared cell list, than the source gNB 170.

As shown with regard to FIGS. 2 to 4, the example embodiments provide a process of handover with only a preparation and an execution phase. In contrast, legacy handover and conditional handover processes are known to include three phases: preparation, execution, and completion. In the example embodiments, only the RRC is relocated while the NG connection is kept between gNB 170 that prepared the candidate cells (gNBs 170) and the CN 410 (for example, AMF). In process one, the source gNB 170 (the one that prepares the candidate gNBs 170) prepares multiple version of contexts required when UE 110 takes different sequences of hand overs to reach the target gNB 170 (direct (source to target) and indirect (source to intermediate cell 1, . . . , to intermediate cell n, to target cell) paths). In legacy handover and conditional handover processes, only direct path (source to target) is considered. In the example embodiments, UE 110 may be required to keep track of the handover history which is included in the Handover complete message to help target gNB 170 determine the "path" and which version of prepared context to use. In process two, UE 110 may be required to derive the security key using the keNB that has been in use during the RRC connection with the source gNB 170 (for example, the gNB 170 that prepared the candidate cells). In contrast, in legacy handover and conditional handover processes, the key is derived using the key which has been in use in the last serving cell.

Figure 5:
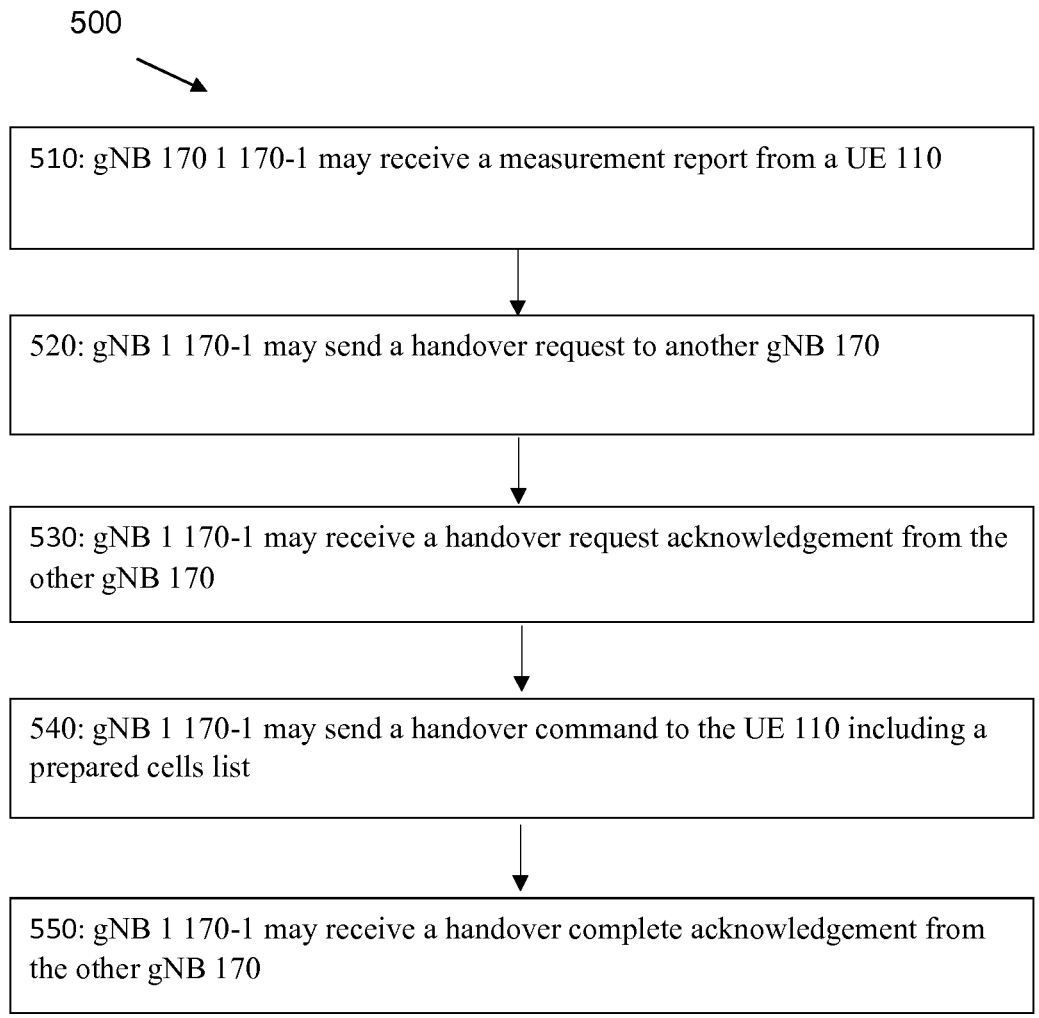
FIG. 5 shows a method in accordance with example embodiments which may be performed by an apparatus.

FIG. 5 is an example flow diagram 500 illustrating a method in accordance with example embodiments which may be performed by an apparatus.

At block 510, a triggering condition may be fulfilled, triggering a conditional handover (such as described with respect to step 1 of FIG. 4, herein above). For example, a neighbor cell becomes offset better than serving cell, similar to LTE's or NR's A3 event triggering condition (which triggers measurement reporting for a UE for conditional handover). The gNB 170 may receive a measurement report from a UE 110.

At block 520, the gNB 1 170-1 may send a handover request to another gNB 170, for example, gNB 2 170-2 or gNB 3 170-3 based on a decision of which gNB 170 to handover the UE 110 to (such as described with respect to step 2 (gNB 2 170-2) or alternately step 3 (gNB 3 170-3) of FIG. 4, herein above).

At block 530, the gNB 1 170-1 may receive a handover request acknowledgement from the gNB 170 to which it sent the handover request (such as described with respect to step 4 (gNB 2 170-2) or alternately step 5 (gNB 3 170-3) of FIG. 4, herein above).

At block 540, the gNB 1 170-1 may send a handover command to the UE 110 including a prepared cells list (such as described with respect to step 6 of FIG. 4, described herein above).

At block 550, the gNB 170-1 may receive a handover complete acknowledgment from the gNB 170 to which the UE 110 was handed over to (such as described with respect to step 9 (gNB 2 170-2) or alternately step 12 or 16 (gNB 3 170-3) of FIG. 4, herein above).

Figure 6:
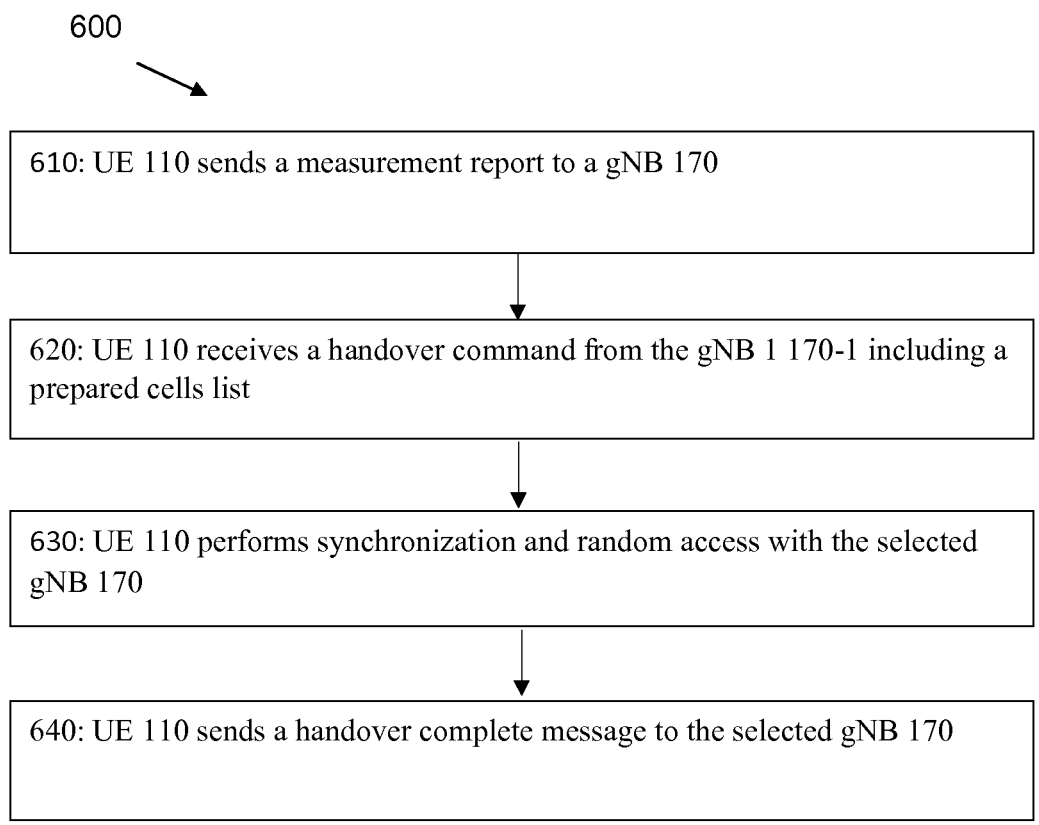
FIG. 6 shows another method in accordance with example embodiments which may be performed by an apparatus.

FIG. 6 is an example flow diagram 600 illustrating a method in accordance with example embodiments which may be performed by an apparatus.

At block 610, a triggering condition may be fulfilled, triggering a conditional handover (such as described with respect to step 1 of FIG. 4, herein above). For example, a neighbor cell becomes offset better than serving cell, similar to LTE's or NR's A3 event triggering condition. The UE 110 may send a measurement report to a gNB 170.

At block 620, the UE 110 may receive a handover command from the gNB 1 170-1 including a prepared cells list (such as described with respect to step 6 of FIG. 4, described herein above).

At block 630, the UE 110 may perform synchronization and random access with the selected gNB 170 (such as described with respect to step 7 (gNB 2 170-2) or alternately step 10 or 13 (gNB 3 170-3) of FIG. 4, herein above).

At block 640, the UE 110 may send a handover complete message to the selected gNB 170 (such as described with respect to step 8 (gNB 2 170-2) or alternately step 11 or 14 (gNB 3 170-3) of FIG. 4, herein above).

Without in any way limiting the scope, interpretation, or application of the claims appearing below, a technical effect of one or more of the example embodiments disclosed herein is to arbitrarily (or without predetermined instructions) increase the number of the prepared cells for conditional handover up to the as large as the Xn coverage of the configuring gNB 170.

Another technical effect is to minimize the signaling overhead due to conditional handover preparation especially for high speed UE with known path, for example, high-speed trains or mobile robots (for example, automated guided vehicles), and cell boundary involving crossing a cell with short time of stay.

Another technical effect is to increase the utilization of small cells by ultra-high speed UEs 110.

Another technical effect is to allow UEs 110 to make unlimited number of consecutive conditional handovers within the coverage area of the prepared cell(s). The "Xn coverage area" may be in practice limited to neighbor cells, for example, cells identified by the ANR 410. However, due to ping pong, there may be many possible consecutive handovers even within a small number of prepared cells. For example, A→B→D→B→C→A→D→C and so on.

In an example scenario, a device initiates conditional handover in which path switching is required and multiple cells are prepared. After Xn handover is completed, path switching procedure is initiated where the new serving cell receives a fresh {NH, NCC} pair from AMF.

The fresh {NH, NCC} pair is used during the next X2 handover, which makes the context in other prepared cells obsolete. This is applicable even to a ping-pong (for example, between gNBs) if it involves path switching. Thus, preparing a new set of cells (which can be the same or different as the previously prepared cell) needs to be started over. The example embodiments provide methods to avoid the reestablishment of candidate cells after every handover, which improves the efficiency and signaling overhead of conditional handover.

An example embodiment may provide a method comprising determining, by a source base station, based on at least one of a measurement report received from a terminal device and a mobility trajectory of the terminal device, a prepared cell list that includes a set of cells where the terminal device is capable of handover. The method includes sending at least one required context for the handover to the set of cells in the prepared cell list, and receiving acknowledgement from the set of cells. The method also includes sending a handover command message, which contains the prepared cell list, to the terminal device, wherein the prepared cell list provides a capability for the terminal device to make a number of handovers when the terminal device is within a coverage area of the set of cells.

In accordance with the example embodiments as described in the paragraphs above, terminating, while the terminal device is within the coverage of the set of cells, an NG connection for the terminal device.

In accordance with the example embodiments as described in the paragraphs above, wherein the at least one required context includes multiple contexts, wherein each context is generated based on a path for the terminal device to reach a particular one of the set of cells from the source base station.

In accordance with the example embodiments as described in the paragraphs above, wherein each path requires a different horizontally generated key during handover.

In accordance with the example embodiments as described in the paragraphs above, wherein each particular one of the set of cells receives a single context, and when the terminal device enters a new cell, the terminal device generates a new security key using a security key that has been in use in the source base station.

In accordance with the example embodiments as described in the paragraphs above, wherein the prepared cell list consists of at least a source cell and a target cell, and the source cell and the set of cells have Xn connectivity to the source base station.

In accordance with the example embodiments as described in the paragraphs above, wherein the at least one required context retains validity as long as the terminal device is at least one of: within the coverage of the set of cells, and as long as a validity timer is running In accordance with the example embodiments as described in the paragraphs above, wherein each particular one of the set of cells receives a single context, and when the terminal device enters a new cell, the terminal device generates a new security key using a security key that has been in use in the source base station.

In accordance with the example embodiments as described in the paragraphs above, providing a resume identifier in response to a determination that a temporary radio network temporary identifier is not reserved in a prepared cell.

An example embodiment may provide a method comprising sending, by at least one terminal device, at least one measurement report to a source base station, and receiving a handover command from the source base station, wherein the handover command includes a prepared cell list of a set of cells where the terminal device is capable of handover and the prepared cell list provides a capability for the terminal device to make a number of handovers when the terminal device is within a coverage area of the set of cells. The method includes performing synchronization and random access with at least one cell from the set of cells, and sending a handover complete message to the at least one cell.

In accordance with the example embodiments as described in the paragraphs above, wherein the handover complete message further includes a handover history from the source base station to reach the at least one cell.

In accordance with the example embodiments as described in the paragraphs above, wherein each prepared cell in the prepared cells list receives multiple contexts, wherein each context is generated based on a path for the terminal device to reach a target cell from a source cell.

In accordance with the example embodiments as described in the paragraphs above, wherein each path requires a different horizontally generated key during handover.

An example embodiment may provide an apparatus comprising means for determining, by a source base station, based on at least one of a measurement report received from a terminal device and a mobility trajectory of the terminal device, a prepared cell list that includes a set of cells where the terminal device is capable of handover. The apparatus further includes means for sending at least one required context for the handover to the set of cells in the prepared cell list, and means for receiving acknowledgement from the set of cells. The apparatus further includes means for sending a handover complete message that contains the prepared cell list, to the terminal device, wherein the prepared cell list provides a capability for the terminal device to make a number of handovers when the terminal device is within a coverage area of the set of cells.

In accordance with the example embodiments as described in the paragraphs above, further comprising means for terminating, while the terminal device is within the coverage of the set of cells, an NG connection for the terminal device.

In accordance with the example embodiments as described in the paragraphs above, wherein the at least one required context includes multiple contexts, wherein each context is generated based on a path for the terminal device to reach a particular one of the set of cells from the source base station.

In accordance with the example embodiments as described in the paragraphs above, wherein each path requires a different horizontally generated key during handover.

In accordance with the example embodiments as described in the paragraphs above, wherein each particular one of the set of cells receives a single context, and when the terminal device enters a new cell, the terminal device generates a new security key using a security key that has been in use in the source base station.

In accordance with the example embodiments as described in the paragraphs above, wherein the prepared cell list consists of at least a source cell and a target cell, and the source cell and the set of cells have Xn connectivity to the source base station.

In accordance with the example embodiments as described in the paragraphs above, wherein the at least one required context retains validity as long as the terminal device is at least one of: within the coverage of the set of cells, and as long as a validity timer is running In accordance with the example embodiments as described in the paragraphs above, wherein each particular one of the set of cells receives a single context, and when the terminal device enters a new cell, the terminal device generates a new security key using a security key that has been in use in the source base station.

In accordance with the example embodiments as described in the paragraphs above, means for providing a resume identifier in response to a determination that a temporary radio network temporary identifier is not reserved in a prepared cell.

An example embodiment may provide an apparatus comprising means for sending, by at least one terminal device, at least one measurement report to a source base station. The apparatus includes means for receiving a handover command from the source base station, wherein the handover command includes a prepared cell list of a set of cells where the terminal device is capable of handover and the prepared cell list provides a capability for the terminal device to make a number of handovers when the terminal device is within a coverage area of the set of cells. The apparatus further includes means for performing synchronization and random access with at least one cell from the set of cells, and means for sending a handover complete message to the at least one cell.

In accordance with the example embodiments as described in the paragraphs above, wherein the handover complete message further includes a handover history from the source base station to reach the at least one cell.

In accordance with the example embodiments as described in the paragraphs above, wherein each prepared cell in the prepared cells list receives multiple contexts, wherein each context is generated based on a path for the terminal device to reach a target cell from a source cell.

In accordance with the example embodiments as described in the paragraphs above, wherein each path requires a different horizontally generated key during handover.

An example embodiment may be provided in an apparatus comprising at least one processor; and at least one non-transitory memory including computer program code, the at least one memory and the computer program code may be configured to, with the at least one processor, cause the apparatus to: determine, by a source base station, based on at least one of a measurement report received from a terminal device and a mobility trajectory of the terminal device, a prepared cell list that includes a set of cells where the terminal device is capable of handover. The apparatus may also send at least one required context for the handover to the set of cells in the prepared cell list, and receive acknowledgement from the set of cells. Send a handover command message, which contains the prepared cell list, to the terminal device, wherein the prepared cell list provides a capability for the terminal device to make a number of handovers when the terminal device is within a coverage area of the set of cells.

In accordance with the example embodiments as described in the paragraphs above, terminate, while the terminal device is within the coverage of the set of cells, an NG connection for the terminal device.

In accordance with the example embodiments as described in the paragraphs above, wherein the at least one required context includes multiple contexts, wherein each context is generated based on a path for the terminal device to reach a particular one of the set of cells from the source base station.

In accordance with the example embodiments as described in the paragraphs above, wherein each path requires a different horizontally generated key during handover.

In accordance with the example embodiments as described in the paragraphs above, wherein each particular one of the set of cells receives a single context, and when the terminal device enters a new cell, the terminal device generates a new security key using a security key that has been in use in the source base station.

In accordance with the example embodiments as described in the paragraphs above, wherein the prepared cell list consists of at least a source cell and a target cell, and the source cell and the set of cells have Xn connectivity to the source base station.

In accordance with the example embodiments as described in the paragraphs above, wherein the at least one required context retains validity as long as the terminal device is at least one of: within the coverage of the set of cells, and as long as a validity timer is running In accordance with the example embodiments as described in the paragraphs above, wherein each particular one of the set of cells receives a single context, and when the terminal device enters a new cell, the terminal device generates a new security key using a security key that has been in use in the source base station.

In accordance with the example embodiments as described in the paragraphs above, provide a resume identifier in response to a determination that a temporary radio network temporary identifier is not reserved in a prepared cell.

An example embodiment may be provided in an apparatus comprising at least one processor; and at least one non-transitory memory including computer program code, the at least one memory and the computer program code may be configured to, with the at least one processor, cause the apparatus to: send, by at least one terminal device, at least one measurement report to a source base station, and receiving a handover command from the source base station, wherein the handover command includes a prepared cell list of a set of cells where the terminal device is capable of handover and the prepared cell list provides a capability for the terminal device to make a number of handovers when the terminal device is within a coverage area of the set of cells. Perform synchronization and random access with at least one cell from the set of cells, and send a handover complete message to the at least one cell.

In accordance with the example embodiments as described in the paragraphs above, wherein the handover complete message further includes a handover history from the source base station to reach the at least one cell.

In accordance with the example embodiments as described in the paragraphs above, wherein each prepared cell in the prepared cells list receives multiple contexts, wherein each context is generated based on a path for the terminal device to reach a target cell from a source cell.

In accordance with the example embodiments as described in the paragraphs above, wherein each path requires a different horizontally generated key during handover.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments, these descriptions should not be viewed in a limiting sense. Rather, there are several variations and modifications which may be made without departing from the scope of the present invention.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications which may be made without departing from the scope of the present invention as defined in the appended claims.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of example and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

The invention claimed is:

1. A method, comprising:
    sending, by a terminal device, at least one measurement report to a source base station;
    receiving, by the terminal device and in response to the at least one measurement report, a handover command from the source base station, wherein the handover command includes a prepared cell list of a set of cells where the terminal device is capable of handover and the prepared cell list provides a capability for the terminal device to make multiple consecutive handovers in response to the terminal device being within a coverage area of the set of cells, wherein the set of cells comprises a plurality of prepared cells;
    performing, by the terminal device, synchronization and random access with at least one cell from the set of cells; and
    sending, by the terminal device, a handover complete message to the at least one cell,
    wherein each prepared cell in the prepared cells list has multiple contexts, wherein each context is based on a path for the terminal device to reach a target cell from a source cell, and wherein the method further comprises generating by the terminal device a horizontally generated key in response to handover to one cell in a corresponding path to reach the target cell from the source cell, wherein each path requires a different horizontally generated key.

2. The method according to claim 1, wherein the handover complete message further includes a handover history of the terminal device of one or more handovers from the source base station to reach the at least one cell.

3. An apparatus, comprising:
    at least one processor; and
    at least one memory including computer program code, the at least one memory and the computer program code configured, with the at least one processor, to cause the apparatus to perform at least the following:
    determine based on at least one of a measurement report received from a terminal device and a mobility trajectory of the terminal device, a prepared cell list that includes a set of cells where the terminal device is capable of handover, wherein the set of cells comprises a plurality of prepared cells;
    send at least one required context for the handover to the set of cells in the prepared cell list;
    receive acknowledgement from the set of cells; and
    send a handover command that contains the prepared cell list to the terminal device, wherein the prepared cell list provides a capability for the terminal device to make multiple consecutive handovers in response to the terminal device being within a coverage area of the set of cells,
    wherein the at least one required context includes multiple contexts, wherein each context is generated based on a path for the terminal device to reach a particular one of the set of cells from the apparatus, and
    wherein each path requires a different horizontally generated key for handover.

4. The apparatus of claim 3, wherein the apparatus further caused to perform at least the following:
    terminate, while the terminal device is within the coverage area of the set of cells, a next generation connection for the terminal device.

5. The apparatus of claim 3, wherein the apparatus sends each particular one of the set of cells a single context associated with the terminal, and in response to the terminal device entering a specific cell of the set of cells, the terminal device is to generate a new security key unique for that specific cell using a security key that has been in use by the terminal device and the apparatus.

6. The apparatus of claim 3, wherein the prepared cell list comprises at least a source cell and a target cell, and the source cell and its corresponding source base station have Xn connectivity to all other cells not formed by the apparatus in the prepared cell list.

7. The apparatus of claim 3, wherein the at least one required context retains validity as long as the terminal device is within the coverage area of the set of cells.

8. The apparatus of claim 3, wherein the apparatus further caused to perform at least the following:
    initiate a validity timer for a corresponding one of the cells in the set of cells, and
    in response to the validity timer running for a given amount of time without the terminal device handing over to the corresponding cell, initiate a context release procedure towards the corresponding cell.

9. The apparatus of claim 3, wherein the apparatus further caused to perform at least the following:
    provide a timer duration to one or more cells in the set of cells, the timer duration to be used by the one or more cells to discard the at least one required context in response to the terminal device not initiating a handover to a corresponding one of the one or more cells before the timer duration expires.

10. The apparatus of claim 3, wherein the apparatus is caused to send each particular one of the set of cells a single context associated with the terminal, and in response to the terminal device entering a cell of the set of cells, the terminal device is to generate a new security key using a security key that has been in use by the terminal device and the apparatus.

11. The apparatus of claim 3, wherein the apparatus further caused to perform at least the following:
provide by the apparatus a resume identifier in response to a determination that a temporary radio network temporary identifier is not reserved in a prepared cell.

12. The apparatus of claim 3, wherein the capability for the terminal device to make multiple consecutive handovers comprises a capability for the terminal device to make an unlimited amount of consecutive handovers within the coverage area.

13. An apparatus, comprising:
at least one processor; and
at least one memory including computer program code,
the at least one memory and the computer program code configured, with the at least one processor, to cause the apparatus to perform at least the following:
send at least one measurement report to a source base station;
receive, in response to the at least one measurement report, a handover command from the source base station, wherein the handover command includes a prepared cell list of a set of cells where the apparatus is capable of handover and the prepared cell list provides a capability for the apparatus to make multiple consecutive handovers in response to the apparatus being within a coverage area of the set of cells, wherein the set of cells comprises a plurality of prepared cells;
perform synchronization and random access with at least one cell from the set of cells; and
send a handover complete message to the at least one cell wherein each prepared cell in the prepared cells list has multiple contexts, wherein each context is based on a path for the apparatus to reach a target cell from a source cell, and wherein the apparatus further caused to generate a horizontally generated key in response to handover to one cell in a corresponding path to reach the target cell from the source cell, wherein each path requires a different horizontally generated key.

14. The apparatus of claim 13, wherein the handover complete message further includes a handover history of the apparatus of one or more handovers from the source base station to reach the at least one cell.

15. The apparatus of claim 13, wherein the capability for the apparatus to make multiple consecutive handovers comprises a capability for the apparatus to make a limitless amount of handovers within the coverage area.

16. The apparatus of claim 13, wherein the apparatus is further caused to
in response to the apparatus entering a cell of the set of cells, generate a new security key using a security key that has been in use by the apparatus and the source base station.

* * * * *